United States Patent [19]

Takemura et al.

[11] Patent Number: 4,802,942

[45] Date of Patent: Feb. 7, 1989

[54] METHOD OF MAKING MULTILAYER COMPOSITE HOLLOW FIBERS

[75] Inventors: Tohru Takemura, Ohtake; Hajime Itoh, Hiroshima; Jun Kamo, Ohtake; Haruhiko Yoshida, Yamaguchi, all of Japan

[73] Assignee: Mitsubishi Rayon Co., Ltd., Tokyo, Japan

[21] Appl. No.: 91,894

[22] Filed: Sep. 1, 1987

Related U.S. Application Data

[62] Division of Ser. No. 878,678, Jun. 26, 1986, Pat. No. 4,713,292.

[30] Foreign Application Priority Data

Jun. 27, 1985 [JP] Japan .............................. 60-141385

[51] Int. Cl.$^4$ ............................................. B32B 31/16
[52] U.S. Cl. ................................. 156/244.13; 55/16; 55/21; 55/69; 55/158; 210/500.23; 210/500.27; 210/500.29; 210/500.35; 210/500.37; 210/500.41; 210/500.42; 210/490; 428/373; 428/376; 428/398
[58] Field of Search ............. 156/244.11, 244.13; 55/16, 21, 69, 158; 210/500.23, 500.27, 500.35, 500.29, 500.37, 500.41, 500.42, 490; 428/373, 376, 398

[56] References Cited

U.S. PATENT DOCUMENTS

| | | | |
|---|---|---|---|
| 4,214,020 | 7/1980 | Ward et al. | 210/490 |
| 4,230,463 | 10/1980 | Henis et al. | 55/16 |
| 4,243,701 | 1/1981 | Riley et al. | 55/158 |
| 4,267,047 | 5/1981 | Hennie et al. | 210/490 |
| 4,317,729 | 3/1982 | Yamashi et al. | 428/398 |
| 4,405,688 | 9/1983 | Cowery et al. | 55/16 |
| 4,421,529 | 12/1983 | Revak et al. | 55/21 |
| 4,470,831 | 9/1984 | Hirose | 55/158 |
| 4,666,469 | 5/1987 | Krueger et al. | 55/16 |

*Primary Examiner*—Caleb Weston
*Attorney, Agent, or Firm*—Oblon, Fisher, Spivak, McClelland & Maier

[57] ABSTRACT

Disclosed are a multilayer composite hollow fiber comprising at least one nonporous separating membrane layer (A) performing a separating function and two or more porous layers (B) performing a reinforcing function, the layer (A) and the layers (B) being alternately laminated so as to give a structure having internal and external surfaces formed by the porous layers (B), as well as a method of making such a hollow fiber.

In this multilayer composite hollow fiber, the separating membrane can be formed as an ultrathin, homogeneous membrane. Moreover, the separating membrane is not liable to get damaged owing to the unique structure of the hollow fiber. Furthermore, such hollow fibers can be readily and stably produced on an industrial scale.

5 Claims, No Drawings

METHOD OF MAKING MULTILAYER COMPOSITE HOLLOW FIBERS

This is a division of application Ser. No. 878,678 filed June 26, 1986, U.S. Pat. No. 4,713,292.

BACKGROUND OF THE INVENTION

1. Field of the Invention

This invention relates to high-performance multilayer composite hollow fibers including at least one nonporous membrane layer and suitable for the separation of gases and for other purposes, as well as a method of making the same.

2. Description of the Prior Art

A large number of methods for the separation and purification of substances have been developed and improved from long ago.

The membrane separation technique is one of these methods. On a broad survey of the progress of its improvement, the general trend of technological advancement involves the development of excellent membrane materials, the development of techniques for forming thin membranes serving to enhance separating efficiency and the development of hollow fibers capable of enhancing equipment efficiency.

Among various separating membranes are nonporous membranes useful for the separation of gases and for other purposes In such a nonporous membrane, the permeation rate for a gas is determined by its diffusion through the membrane, and the diffusion rate of the gas is greatly influenced by the thickness of the membrane. Accordingly, it is common practice to make the nonporous membrane as thin as possible Moreover, since such a thin nonporous membrane has inadequate strength, attempts have been made to form a composite structure by combining the membrane with a porous layer. As one of such techniques for the formation of a thin membrane, a method is being extensively employed in which a thin membrane is formed on a porous substrate according to the coating or vapor deposition process. However, when a coating material is applied to a porous substrate, it penetrates into the pores of the substrate and fails to form a substantially thin membrane. More specifically, the membrane is sufficiently thin in the regions not corresponding to the pores of the porous substrate, but is undesirably thick in the regions corresponding to the pores. If an attempt is made to overcome this disadvantage by reducing the thickness of the membrane in the regions corresponding to the pores, pinholes will appear. For this reason, it is practically impossible to form a thin membrane of uniform thickness according to this method.

In order to overcome the above-described disadvantage, another method has been proposed in which the pores of a porous substrate are filled with a soluble material in advance, a thin membrane layer is formed on the surface of the substrate, and the soluble material is then leached out of the substrate. However, this method can hardly yield a thin membrane layer of uniform thickness. Moreover, this method is disadvantageous in that the thin membrane layer is liable to be damaged during the leaching process and in that the thin membrane layer tends to peel away from the finished composite membrane. Furthermore, it is difficult to apply this method to the manufacture of hollow fibers.

Still another method for forming a thin separating membrane is the formation of an asymmetric membrane from a polymer solution. For example, reverse osmosis membranes formed of aromatic polyamide and ultrafiltration membranes formed of polyacrylonitrile are being commercially produced by this method.

However, all of these membranes are formed according to such a technique that, in forming a membrane from a polymer solution, the superficial part of the membrane is solidified densely and the internal part thereof is made porous by selection of proper solidifying conditions or by use of the leaching process. Thus, these separating membranes consist of a single material.

Accordingly, the structure of the membranes formed by this method changes continuously from the superficial dense part toward the internal porous part and includes an intermediate structural part performing no important function. This is not so desirable from the viewpoint of filtering efficiency.

Moreover, the thin, nonporous membrane layer performing a separating function is exposed on one side of these composite membranes. This is disadvantageous in that any mechanical force exerted during manufacture or use tends to result in pinholes or cause damage to the nonporous membrane layer.

SUMMARY OF THE INVENTION

It is an object of the present invention to provide a novel membrane structure including a very thin, nonporous separating membrane having excellent durability.

It is another object of the present invention to provide hollow fibers including a nonporous separating membrane having excellent separation characteristics.

It is still another object of the present invention to provide a method of making hollow fibers including a very thin, nonporous separating membrane which method permits such hollow fibers to be stably produced on an industrial scale.

According to the present invention, there is provided a multilayer composite hollow fiber comprising at least one nonporous separating membrane layer (A) performing a separating function and two or more porous layers (B) performing a reinforcing function, the layer (A) and the layers (B) being alternately laminated so as to give a structure having inner and outer surfaces formed by the porous layers (B).

According to the present invention, there is also provided a method of making a multilayer composite hollow fiber as described above which comprises the steps of co-spinning a polymer (A') for forming the separating membrane layer and a polymer (B') for forming the porous layers through a spinning nozzle of multiple tubular construction so as to sandwich the polymer (A') between two layers of the polymer (B'), and stretching the resulting hollow fiber so as to make the layers (B) porous while leaving the layer (A) nonporous.

DESCRIPTION OF THE PREFERRED EMBODIMENTS

The hollow fibers of the present invention have a structure in which one or each thin separating membrane layer (A) is sandwiched between two highly permeable, porous layers (B).

Specifically, the hollow fibers are composed of at least three layers. The outermost and innermost layers consist of porous layers (B) serving as reinforcements, while the intermediate layer consists of a very thin membrane layer (A) performing a separating function. Basically, a separating membrane layer (A) of single-layer construction will suffice. However, the separating membrane layer (A) may optionally be composed of two or more sublayers according to the intended purpose. By using such a separating membrane layer (A) of multilayer construction, its possible impairment of performance due to pinholes and similar defects can be minimized. Although nothing can be better than the absence of pinholes and similar defects, there is an unavoidable tendency for such defects to increase as the separating membrane is made thinner so as to enhance the separating performance to the utmost. Consequently, such hollow fibers must be produced on the basis of a trade-off among membrane thickness, performance and defect level. From the standpoint of a manufacturer, it is a great advantage that little care is required to prevent the development of defects.

Generally, the layer performing a separating function is the most important of all layers constituting a separating membrane. If this layer is situated on the outermost side of the membrane, there is a risk of causing damage to its surface during handling or the like. In contrast, the hollow fibers of the present invention are desirably free from such a risk because the separating membrane layer (A) performing a separating function constitutes an intermediate layer of a structure consisting three or more layers.

In the practice of the present invention, a variety of polymers may be used as the polymer (A') for forming the nonporous separating membrane layer (A). Examples of such polymers include silicones, polyurethanes, cellulosics, polyolefins, polysulfones, polyvinyl alcohol, polyesters, polyethers, polyamides and polyimides.

It may be practically impossible to form some of these polymers into a film. However, the present invention only requires that a separating membrane formed of the aforesaid polymer (A') is present in the finished hollow fibers. Accordingly, there may be used any polymer that can have the form of a viscous fluid at the time of spinning.

Thus, the polymer (A') need not be a straight-chain polymer having solubility or fusibility.

More specifically, if it is difficult to melt a polymer in itself, it may be used in the form of a solution or in the state of a prepolymer. Alternatively, its fluidity may be controlled by the addition of a suitable plasticizer. The plasticizer can be any of various compounds that are commonly used as plasticizers. However, it is preferable to use a plasticizer selected from phthalic acid esters, fatty acid esters, glycerol, polyethylene glycol and the like.

As the polymer (B') for forming the porous layers (B), there may be used any material that can form hollow fibers. However, judging from the ease of manufacture and the paucity of soluble matter, it is preferable to use a crystalline material which can be formed to the hollow fiber by melt spinning and can be made porous by stretching it at low or ordinary temperatures to create microcrazes between crystals. Among the materials useful for this purpose are crystalline thermoplastic polymers. Specific examples thereof include polyolefins, as typified by polyethylene and polypropylene, polycarbonates, polyesters and the like.

Where the porous layers (B) are formed by stretching, it is to be understood that, under the stretching conditions for forming the porous layers (B) performing a reinforcing function, the separating membrane layer (A) performing a separating function must be amenably stretched so as to remain nonporous.

To this end, a noncrystalline polymer may be used as the polymer (A') for forming the separating membrane layer (A). Alternatively, where a crystalline polymer is used as the polymer (A'), it should have a lower melting point or a greater melt index than the polymer (B') for forming the porous layers (B) performing a reinforcing function. It is a matter of course that, as described above, a solvent or a plasticizer may be added to the polymer (A') so as to enhance its fluidity.

The hollow fibers of the present invention preferably have an internal diameter of 0.1 to 5 mm and a wall thickness of 10 to 1000 $\mu$m. From the viewpoint of separating efficiency, the thickness of the separating membrane should preferably be not greater than 5 $\mu$m and more preferably not greater than 2 $\mu$m.

The hollow fibers of the present invention have a multilayer composite structure in which one or each nonporous separating membrane layer performing a separating function is sandwiched between two porous layers performing a reinforcing function. Thus, no bond is needed between the layers and the materials of the layers may be chosen without consideration for their bonding properties. This is beyond imagination in the case of flat membranes and constitutes one of the distinctive features of hollow fibers.

Now, the present method of making a multilayer composite hollow fiber will be more specifically described hereinbelow in accordance with an embodiment in which the porous layers performing a reinforcing function is formed by melt spinning and subsequent stretching.

As described above, a crystalline thermoplastic polymer is used as the polymer (B') for forming the porous layers performing a reinforcing function, whereas a noncrystalline polymer or a polymer having a lower melting point or a greater melt index than the polymer (B') is used as the polymer (A') for forming the separating membrane layer performing a separating function. Using a spinning nozzle of the multiple tubular construction, a composite hollow fiber is spun in such a way that the polymer (B') forms the outermost and innermost layers and the polymer (A') is sandwiched therebetween.

The spinning nozzle may have three or five concentrically arranged orifices

For this purpose, it is preferable to employ an extrusion temperature ranging from the melting point of the polymer (B') to a temperature about 80° C. higher than the melting point, and it is also preferable to employ a spinning draw ratio of not less than 30. If the extrusion temperature is higher than the melting point by more than about 80° C., it is difficult to achieve stable spinning. If the spinning draw ratio is less than 30, the melt-spun polymer (B') has a low degree of orientation and cannot be satisfactorily drawn in a subsequent stretching step. As a result, it is difficult to form micropores in the layers (B).

The hollow fiber so formed is preferably annealed at a temperature ranging from the glass transition point to the melting point of the polymer (B'). Thereafter, the hollow fiber is stretched with a stretch ratio of 5 to 150% at a temperature ranging from 0° C. to a temperature 5° C. lower than the melting point of the polymer (B') so as to create microcrazes in the layers (B) consisting of the polymer (B'). Then, the hollow fiber is stretched in one or more stages at a temperature higher than the aforesaid stretching temperature and lower than the melting point of the polymer (B'). This serves to expand the pores formed by the microcrazes and stabilize the shape of the pores. Furthermore, in order to improve its thermal stability, the hollow fiber may be heat-treated under constant-length or relaxed conditions at a temperature ranging from the melting point of the polymer (B') to a temperature 5° C. lower than its melting point.

Where the polymer (A') forming the layer (A) is a noncrystalline polymer or a polymer containing a solvent or a plasticizer, the above-described stretching process does not make the layer (A) porous, but allows it to be amenably stretched with a gradual reduction in thickness. If the polymer (A') forming the layer (A) has a lower melting point than the polymer (B'), the extrusion temperature should be within the aforesaid extrusion temperature range but above a temperature 60° C. higher than the melting point of the polymer (A'), or the first-stage stretching temperature should be within the aforesaid stretching temperature range but above a temperature 70° C. lower than the melting point of the polymer (A'). If the polymer (A') forming the layer (A) is of the same type as the polymer (B') but has a melt index different from that of the polymer (B'), it is preferable to reduce its melt viscosity and thereby decrease the stress applied to the polymer melt for the purpose of suppressing the orientation and crystallization of the polymer (A'). More specifically, the layers (B) alone can be made porous by employing an extrusion temperature above a temperature 30° C. higher than the melting point of the polymer (A').

In the prior art, it has been difficult to form a thin membrane having a uniform thickness of not greater than 5 μm on a porous substrate. However, in the practice of the present invention and especially in its embodiment in which the layers (B) are made porous by stretching, the layers (B) become porous without any reduction in thickness, and the layer (A) alone is stretched at the intended stretch ratio and thereby reduced in thickness. Thus, the present invention make it possible to form a thin membrane having a smaller and more uniform thickness than has been attainable in the prior art.

The present invention is further illustrated by the following examples.

EXAMPLE 1

A hollow fiber was melt-spun from a combination of two different materials by using a spinning nozzle having three concentrically arranged annular orifices. Specifically, polyethylene having a density of 0.968 g/cm$^3$ and a melt index of 5.5 was melt-extruded through the innermost and outermost orifices of the nozzle, while polyethylene having a density of 0.920 g/cm$^3$ and a melt index of 5.0 was melt-extruded through the intermediate orifice of the nozzle. This spinning was carried out at an extrusion temperature of 160° C. and an extrusion line speed of 5 cm/min., and the hollow fiber so formed was taken up at a take-up speed of 800 m/min.

The unstretched hollow fiber thus obtained had an internal diameter of 200 μm and consisted of three concentrically arranged layers having thickness of 10, 2 and 10 μm, respectively, from inside to outside.

This unstretched hollow fiber was passed over a roller heated to 115° C. under constant-length conditions so as to bring the hollow fiber into contact with the roller for 100 seconds and thereby effect its annealing. Thereafter, the annealed hollow fiber was cold-stretched at a stretch ratio of 80% by rollers kept at 28° C., hot-stretched by rollers in a box heated at 105° C. until a total stretch ratio of 400% was achieved, and then heat-set in a box heated at 115° C. while being relaxed by 28% of the total elongation to obtain a composite hollow fiber.

The hollow fiber thus obtained had an internal diameter of 190 μm and consisted of three concentrically arranged layers having thicknesses of 8, 0.6 and 8 μm, respectively, from inside to outside. Electron microscopic observation revealed that slit-like pores having a width of 0.3 to 0.5 μm and a length of 0.8 to 1.1 μm had been formed in the innermost and outermost layers. On the other hand, measurement of gas permeation rate revealed that the intermediate layer was a homogeneous membrane having neither pores nor pinholes. This composite hollow fiber had an oxygen permeation rate of $4.5 \times 10^{-6}$ cm$^3$/cm$^2$.sec.cmHg and a nitrogen permeation rate of $1.5 \times 10^{-6}$ cm$^3$/cm$^2$.sec.cmHg, indicating that it was selectively permeable to oxygen and had an excellent permeation rate.

EXAMPLE 2

A hollow fiber was melt-spun from a combination of two different materials by using a spinning nozzle having three concentrically arranged annular orifices Specifically, polypropylene having a density of 0.913 g/cm$^3$ and a melt index of 15 was melt-extruded through the innermost and outermost orifices of the nozzle, while poly-4-methylpentene-1 having a density of 0.835 g/cm$^3$ and a melt index of 26 was melt-extruded through the intermediate orifice of the nozzle. This spinning was carried out at an extrusion temperature of 250° C. and an extrusion line speed of 5 cm/min., and the hollow fiber so formed was taken up at a take-up speed of 400 m/min.

The unstretched hollow fiber thus obtained had an internal diameter of 280 μm and consisted of three concentrically arranged layers having thicknesses of 14, 1.5 and 17 μm, respectively, from inside to outside.

This unstretched hollow fiber was passed over a roller heated to 140° C. under constant-length conditions so as to bring the hollow fiber into contact with the roller for 100 seconds and thereby effect its annealing. Thereafter, the annealed hollow fiber was cold-stretched at a stretch ratio of 20% by rollers kept at 60° C., hot-stretched by rollers in a box heated at 135° C. until a total stretch ratio of 200% was achieved, and then heat-set in a box heated at 140° C. while being relaxed by 28% of the total elongation to obtain a composite hollow fiber.

The hollow fiber thus obtained had an internal diameter of 265 μm and consisted of three concentrically arranged layers having thicknesses of 12, 0.7 and 14 μm, respectively, from inside to outside. Electron microscopic observation revealed that slit-like pores having a width of 0.07 to 0.09 μm and a length of 0.2 to 0.5 μm had been formed in the innermost and outermost layers. On the other hand, measurement of gas permeation rate revealed that the intermediate layer consisting of poly-4-methylpentene-1 was a homogeneous membrane having neither pores nor pinholes. This composite hollow fiber had an oxygen permeation rate of $4.7 \times 10^{-6}$ cm$^3$/cm$^2$.sec.cmHg and a nitrogen permeation rate of $1.5 \times 10^{-6}$ cm$^3$/cm$^2$.sec.cmHg, indicating that it was selectively permeable to oxygen and had an excellent permeation rate.

EXAMPLE 3

A hollow fiber was melt-spun from a combination of two different materials by using a spinning nozzle having three concentrically arranged annular orifices Specifically, the same polypropylene as used in Example 2 was melt-extruded through the innermost and outermost orifices of the nozzle, while ethyl cellulose having a degree of ethoxylation of 49% was melt-extruded through the intermediate orifice of the nozzle. This spinning was carried out at an extrusion temperature of 205° C. and an extrusion line speed of 4 cm/min., and the hollow fiber so formed was taken up at a take-up speed of 300 m/min.

The unstretched hollow fiber thus obtained had an internal diameter of 290 $\mu$m and consisted of three concentrically arranged layers having thicknesses of 16, 1.9 and 18 $\mu$m, respectively, from inside to outside.

This unstretched hollow fiber was passed over a roller heated to 130° C. under constant-length conditions so as to bring the hollow fiber into contact with the roller for 180 seconds and thereby effect its annealing. Thereafter, the annealed hollow fiber was cold-stretched at a stretch ratio of 17% by rollers kept at 60° C., hot-stretched by rollers in a box heated at 130° C. until a total stretch ratio of 180% was achieved, and then heat-set in a box heated at 130° C. while being relaxed by 25% of the total elongation to obtain a composite hollow fiber.

The hollow fiber thus obtained had an internal diameter of 273 $\mu$m and consisted of three concentrically arranged layers having thicknesses of 14, 0.9 and 16 $\mu$m, respectively, from inside to outside. Electron microscopic observation revealed that slit-like pores having a width of 0.07 to 0.09 $\mu$m and a length of 0.1 to 0.4 $\mu$m had been formed in the innermost and outermost layers. On the other hand, measurement of gas permeation rate revealed that the intermediate layer consisting of ethyl cellulose was a homogeneous membrane having neither pores nor pinholes. This composite hollow fiber had an oxygen permeation rate of $2.3 \times 10^{-5}$ cm$^3$/cm$^2$.sec.cmHg and a nitrogen permeation rate of $0.7 \times 10^{-5}$ cm$^3$/cm$^2$.sec.cmHg, indicating that it was selectively permeable to oxygen and had a very high permeation rate.

EXAMPLE 4

A hollow fiber was melt-spun from a combination of two different materials by using a spinning nozzle having three concentrically arranged annular orifices. Specifically, polyethylene having a density of 0.965 g/cm$^3$ and a melt index of 5.2 was melt-extruded through the innermost and outermost orifices of the nozzle, while an ultraviolet-curable silicone resin (commercially available from Toshiba Silicone Co., Ltd., under the trade name of TUV6020) was melt-extruded through the intermediate orifice of the nozzle. This spinning was carried out at an extrusion temperature of 160° C. and an extrusion line speed of 10 cm/min., and the hollow fiber so formed was taken up at a take-up speed of 350 m/min.

The unstretched hollow fiber thus obtained had an internal diameter of 290 $\mu$m and consisted of three concentrically arranged layers having thicknesses of 27, 2.5 and 32 $\mu$m, respectively, from inside to outside.

This unstretched hollow fiber was passed over a roller heated to 110° C. under constant-length conditions so as to bring the hollow fiber into contact with the roller for 100 seconds and thereby effect its annealing. Thereafter, while being irradiated with an 80 W/cm high pressure mercury vapor lamp from a distance of about 10 cm, the annealed hollow fiber was cold-stretched at a stretch ratio of 50% by rollers kept at 30° C., hot-stretched by rollers in a box heated at 100° C. until a total stretch ratio of 300% was achieved, and then heat-set in a box heated at 115° C. while being relaxed by 10% of the total elongation to obtain a composite hollow fiber.

The hollow fiber thus obtained had an internal diameter of 270 $\mu$m and consisted of three concentrically arranged layers having thicknesses of 22, 0.8 and 25 $\mu$m, respectively, from inside to outside. Electron microscopic observation revealed that the innermost and outermost layers had been made porous and that slit-like pores having a width of 0.1 to 0.3 $\mu$m and a length of 0.5 to 0.9 $\mu$m had been formed therein. On the other hand, measurement of gas permeation rate revealed that the intermediate layer consisting of silicone rubber was a homogeneous membrane having neither pores nor pinholes.

This composite hollow fiber had an oxygen permeation rate of $6.2 \times 10^{-4}$ cm$^3$/cm$^2$.sec.cmHg and a nitrogen permeation rate of $3.1 \times 10^{-4}$ cm$^3$/cm$^2$.sec.cmHg, indicating its excellent selective permeability to oxygen.

EXAMPLE 5

A hollow fiber was melt-spun from a combination of two different materials by using a spinning nozzle having three concentrically arranged annular orifices. Specifically, the same polyethylene as used in Example 1 was melt-extruded through the innermost and outermost orifices of the nozzle, while a mixture of acetylcellulose having a degree of acetylation of 40% and polyethylene glycol used as a plasticizer (in an amount of 50% by weight based on the acetylcellulose) was melt-extruded through the intermediate orifice of the nozzle. This spinning was carried out at an extrusion temperature of 170° C. and an extrusion line speed of 7.5 cm/min., and the hollow fiber so formed was taken up at a take-up speed of 300 m/min.

The unstretched hollow fiber thus obtained had an internal diameter of 285 $\mu$m and consisted of three concentrically arranged layers having thicknesses of 25, 0.7 and 25 $\mu$m, respectively, from inside to outside.

This unstretched hollow fiber was passed over a roller heated to 110° C. under constant-length conditions so as to bring the hollow fiber into contact with the roller for 180 seconds and thereby effect its annealing. Thereafter, the annealed hollow fiber was cold-stretched at a stretch ratio of 60% by rollers kept at 30° C., hot-stretched by rollers in a box heated at 110° C. until a total stretch ratio of 300% was achieved, and then heat-set in a box heated at 110° C. while being relaxed by 25% of the total elongation to obtain a composite hollow fiber.

The hollow fiber thus obtained had an internal diameter of 260 $\mu$m and consisted of three concentrically arranged layers having thicknesses of 18, 0.2 and 19 $\mu$m, respectively, from inside to outside. Electron microscopic observation revealed that slit-like pores having a width of 0.1 to 0.2 $\mu$m and a length of 0.4 to 0.8 $\mu$m had been formed in the innermost and outermost layers. On the other hand, measurement of gas permeation rate revealed that the intermediate layer consisting of acetylcellulose was a homogeneous membrane having neither pores nor pinholes. This composite hollow fiber had an oxygen permeation rate of $1.2 \times 10^{-5}$ cm$^3$/cm$^2$.sec.cmHg and a nitrogen permeation rate of $0.4 \times 10^{-5}$ cm$^3$/cm$^2$.sec.cmHg, indicating that it was selectively permeable to oxygen and had a very high permeation rate.

EXAMPLE 6

A hollow fiber was melt-spun from a combination of two different materials by using a spinning nozzle having three concentrically arranged annular orifices. Specifically, the same polypropylene as used in Example 2 was melt-extruded through the innermost and outermost orifices of the nozzle, while a mixture of polyvinyl alcohol having a degree of saponification of 99 mole % and a degree of polymerization of 1700 and glycerol used as a plasticizer (in an amount of 50% by weight based on the polyvinyl alcohol) was melt-extruded through the intermediate orifice of the nozzle. This spinning was carried out at an extrusion temperature of 200° C. and an extrusion line speed of 7 cm/min., and the hollow fiber so formed was taken up at a take-up speed of 300 m/min.

The unstretched hollow fiber thus obtained had an internal diameter of 320 μm and consisted of three concentrically arranged layers having thicknesses of 25, 1.2 and 27 μm, respectively, from inside to outside.

This unstretched hollow fiber was passed over a roller heated to 130° C. under constant-length conditions so as to bring the hollow fiber into contact with the roller for 180 seconds and thereby effect its annealing. Thereafter, the annealed hollow fiber was cold-stretched at a stretch ratio of 17% by rollers kept at 60° C., hot-stretched by rollers in a box heated at 130° C. until a total stretch ratio of 150% was achieved, and then heat-set in a box heated at 130° C. while being relaxed by 25% of the total elongation to obtain a composite hollow fiber.

The hollow fiber thus obtained had an internal arranged layers having thicknesses of 21, 0.5 and 23 μm, respectively, from inside to outside. Electron microscopic observation revealed that slit-like pores having a width of 0.07 to 0.09 μm and a length of 0.1 to 0.3 μm had been formed in the innermost and outermost layers On the other hand, measurement of gas permeation rate revealed that the intermediate layer consisting of polyvinyl alcohol was a homogeneous membrane having neither pores nor pinholes.

Using composite hollow fibers made in the above-described manner, an aqueous ethanol solution having an ethanol concentration of 90% by weight was separated according to the pervaporation technique. Thus, it was found that the flux was as high as 29 kg/m$^2$.hr and the separation factor ($\alpha_{H_2O/C_2H_5OH}$) was 80, indicating that these hollow fibers were selectively permeable to water. These hollow fibers made it possible to concentrate the aqueous ethanol solution to a concentration higher than 99% by weight.

What is claimed is:

1. A method of making a multilayer composite hollow fiber comprising (A) at least one nonporous separating membrane layer which performs a separating function and (B) at least two porous layers which perform a reinforcing function, said layer (A) and said layers (B) being alternately laminated together so as to give a structure having inner and outer surfaces formed by said layers (B), comprising the steps of:
   (i) co-spinning a polymer (A') selected from the group consisting of (a) a non-crystalline polymer, (b) a crystalline polymer having a lower melting point than polymer (B'), (C) a crystalline polymer having a melt index greater than the melt index of polymer (B') and (d) a crystalline polymer containing a solvent or plasticizer which forms said separating membrane layer and a crystalline polymer (B') which forms said porous layers through a spinning nozzle of multiple tubular construction which sandwiches the spun polymer (A') between two layers of the spun polymer (B'), thereby forming a composite hollow fiber; and
   (ii) stretching the resulting hollow fiber thereby imparting porosity to said layers (B) while leaving layer (A) non-porous.

2. The method of claim 1, wherein the spinning temperature ranges from the melting point of the polymer (B') to a temperature about 80° C. higher than said melting point.

3. The method of claim 1, wherein the spinning draw ratio is not less than 30.

4. The method of claim 1, wherein the hollow fiber of step (i) is annealed at a temperature ranging from the glass transition point to the melting point of the polymer (B').

5. The method of claim 1, wherein the stretching of said composite hollow fiber of step (i) is carried out in two steps of:
   (1) cold-stretching the composite hollow fiber of step (i) at a stretching ratio of about 5 to 150% at a temperature ranging from 0° C. to a temperature of 50° C. lower than the melting point of the polymer (B') so as to create microcrazes in the layers (B) consisting of the polymer (B'), and
   (2) hot-stretching the hollow fiber through at least one stage at a temperature higher than the cold-stretching temperature and lower than the melting point of the polymer (B').

* * * * *